(12) United States Patent
Rapakko (10) Patent No.: US 8,648,835 B2
(45) Date of Patent: Feb. 11, 2014

(54) TOUCH SCREEN CONTROLLER

(75) Inventor: Harri Rapakko, Oulu (FI)

(73) Assignee: ST-Ericsson Oy, Turku (FI)

( * ) Notice: Subject to any disclaimer, the term of this patent is extended or adjusted under 35 U.S.C. 154(b) by 150 days.

(21) Appl. No.: 13/142,758

(22) PCT Filed: Dec. 22, 2009

(86) PCT No.: PCT/EP2009/067811
§ 371 (c)(1),
(2), (4) Date: Sep. 19, 2011

(87) PCT Pub. No.: WO2010/076271
PCT Pub. Date: Jul. 8, 2010

(65) Prior Publication Data
US 2012/0001866 A1    Jan. 5, 2012

(30) Foreign Application Priority Data

Dec. 30, 2008  (EP) .................................... 08254186

(51) Int. Cl.
*G06F 3/044*    (2006.01)
*G06F 3/045*    (2006.01)

(52) U.S. Cl.
USPC ........................................ 345/174; 178/18.05

(58) Field of Classification Search
USPC ...................... 345/156–184; 178/18.01–20.04
See application file for complete search history.

(56) References Cited

U.S. PATENT DOCUMENTS

| 5,008,497 A | 4/1991 | Asher |
| 5,736,688 A * | 4/1998 | Barrett ....................... 178/18.05 |
| 2005/0052429 A1 | 3/2005 | Philipp |
| 2007/0074916 A1 | 4/2007 | Hall |
| 2007/0109274 A1 * | 5/2007 | Reynolds ....................... 345/173 |
| 2008/0252608 A1 * | 10/2008 | Geaghan ....................... 345/173 |
| 2009/0122024 A1 * | 5/2009 | Nakamura ....................... 345/173 |
| 2009/0322701 A1 * | 12/2009 | D'Souza ....................... 345/174 |

FOREIGN PATENT DOCUMENTS

WO    2008085719 A2    7/2008

* cited by examiner

*Primary Examiner* — Quan-Zhen Wang
*Assistant Examiner* — Chad Dicke
(74) *Attorney, Agent, or Firm* — Coats & Bennett, P.L.L.C.

(57) ABSTRACT

A controller for a touch-screen sensor is described. The controller comprises a voltage generator for generating a first voltage signal and at least one output for outputting the first voltage signal such that the first voltage is applied across a resistive layer of the sensor in a first direction (e.g. X direction). The controller further comprises an input for receiving a second voltage signal representing the voltage on the resistive layer measured at a touch position by a measuring electrode of the sensor when the sensor is touched. A processor determines the co-ordinate in the first direction (e.g. X co-ordinate) of the touch position using the second voltage signal received during a first measuring period. Specifically, the co-ordinate is determined by determining the attenuation of the first voltage signal in the second voltage signal. The first voltage signal is generated such that the first voltage applied across the resistive layer is a time-varying voltage during the first measuring period, having at least one known characteristic. In one embodiment, voltages are applied across the resistive layer in two directions (e.g. X and Y directions) simultaneously, allowing the processor to determine the X and Y co-ordinates simultaneously.

15 Claims, 7 Drawing Sheets

TOUCH SCREEN CONTROLLER

The present invention relates to a controller for touch-screen sensors, and in particular, but not exclusively, to a controller for resistive touch-screen sensors in touch-screen apparatus.

A typical touch-screen device comprises a touch sensor, a controller and a display. The touch-screen sensor is a user interface device in the form of a panel which, when touched with a finger or stylus, produces signals from which the controller can determine the touch position. The sensor is constructed from transparent materials and may be mounted onto the display so that the output of the display can be seen through the sensor panel. This arrangement allows for a more direct interaction between the user and a device's graphical interface than conventional input devices. For example, the user may select objects in the graphical interface by directly touching them on the display. The device's application program can determine which object was touched using the position information generated by the sensor and controller. Many hand-held devices such as mobile phones, palm pilots and similar devices comprise touch-screens. Some other devices may include a touch-sensor and controller, but have a separate display device. For example, laptop computers often comprise a touch pad which is not an integral part of the display.

Touch-screen technology generally comes in two varieties—capacitive and resistive. There are various designs for resistive touch screens, including what are often known as 4-wire, 5-wire, 7-wire and 9-wire varieties.

One problem with touch-screen apparatus is the presence of noise, which can cause inaccuracies in the measurement of the touch point and result in a loss of resolution. Noise can occur in different forms, such as white noise, where the power density spectrum is even over a particular bandwidth, or tonal noise, which may be characterised by one or more prominent frequencies. For example, when a 5-wire touch-screen sensor forms the input of a high impedance A/D converter in the controller, the sensor may act as an antenna and can pick up noise signals, for example from a back-light source for an LCD display or from external EMI/RFI sources.

Another problem with touch-screen apparatus is the latency between a user touching the sensor and the controller providing co-ordinate information. In order to achieve feedback with a delay that is not significantly noticeable by a user, a latency below 20 ms to 30 ms is desirable. Using known techniques, the determination of the co-ordinates of a touch point requires two separate measurements, one for the X co-ordinate and the other for the Y co-ordinate. This introduces additional latency in the system. The problem is exacerbated in cases where the touch point co-ordinates are determined using an average of multiple measurements since the latency associated with a single co-ordinate pair measurement is multiplied.

In accordance with a first aspect, the present invention provides a controller for a touch-screen sensor, the controller comprising: a voltage generator for generating a first voltage signal; at least one output for outputting the first voltage signal such that the first voltage is applied across a resistive layer of the sensor in a first direction; an input for receiving a second voltage signal representing the voltage on the resistive layer measured at a touch position by a measuring electrode of the sensor when the sensor is touched; a processor for determining the co-ordinate in the first direction of the touch position using the second voltage signal received during a first measuring period, the co-ordinate being determined by determining the attenuation of the first voltage signal in the second voltage signal; the first voltage signal being generated such that the first voltage applied across the resistive layer is a time-varying voltage during the first measuring period, having at least one known characteristic.

In accordance with a second aspect, the present invention provides a method for controlling a touch-screen sensor, the method comprising the steps of: generating a first voltage signal; outputting the first voltage signal such that the first voltage is applied across a resistive layer of the sensor in a first direction; receiving a second voltage signal representing the voltage on the resistive layer measured at a touch position by a measuring electrode of the sensor when the sensor is touched; determining the co-ordinate in the first direction of the touch position using the second voltage signal received during a first measuring period, the co-ordinate being determined by determining the attenuation of the first voltage signal in the second voltage signal; the first voltage signal being generated such that the first voltage applied across the resistive layer is a time-varying voltage during the first measuring period, having at least one known characteristic.

Embodiments of the invention will now be described, by way of example only, with reference to the Figures, in which.

Figure 1:
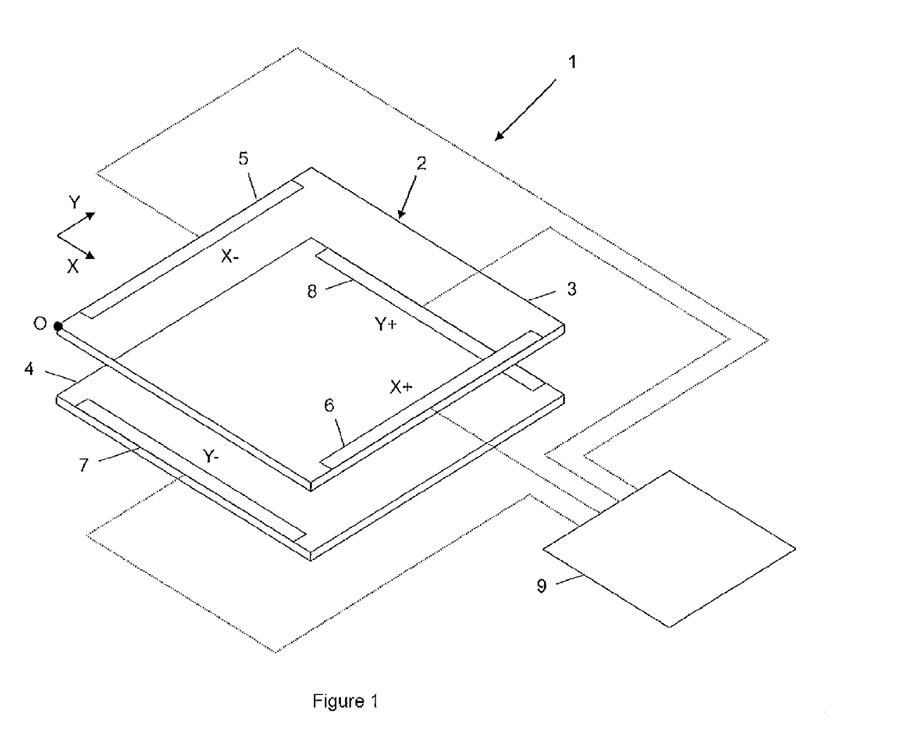
FIG. 1 illustrates the principles of a 4-wire touch-screen arrangement.

FIGS. 1 and 2 illustrate the basic principles of a 4-wire resistive touch-screen arrangement. The touch-screen 1 comprises a sensor 2 formed from two opposing rectangular plates 3, 4, separated by a small gap. The two plates, may be separated, for example, by means of an array of non-conductive spacers (not shown) formed of a resilient material. The two plates 3, 4 are sometimes referred to respectively as the X-plate and Y-plate for reasons that will become clearer below. Opposing surfaces of respective plates 3, 4 are each coated with a uniform layer of resistive material, such as Indium Tin Oxide (ITO). For example, the underside of the top plate 3 and the upper side of the bottom plate 4 shown in FIG. 1 are coated in this way. The resistive layers thus formed each have a uniform surface resistance, and typically create a resistance across each plate of between 10Ω and 1000Ω.

A pair of contacts or electrodes 5, 6 made from a layer of conducting material are formed along two opposite edges of one of the plates 3. A further pair of electrodes 7, 8 are similarly formed along two opposite edges of the other plate 3. The electrodes are arranged so that the electrodes of one of the plates are perpendicular to the electrodes of the other plate. The electrodes formed on the X-plate are sometimes referred to as the X+ and X− electrodes and the electrodes formed on the Y-plate are sometimes referred to as the Y+ and Y− electrodes. The four electrodes 5, 6, 7 and 8 are electrically connected to four respective inputs/outputs of a controller 9.

If the touch-screen arrangement 1 incorporates a display device (not shown), then the substrate forming the plates 3, 4 and the resistive layers are formed of transparent materials. The sensor 2 may then be mounted onto the screen of the display, such as LCD or flat-panel display, so that the visual output of the display can be seen through the sensor 2. If the arrangement does not incorporate a display then the sensor 2 need not be transparent.

The plate touched during use is formed of a flexible and resilient material, such as plastic. When the sensor 2 is touched by a finger or stylus with sufficient force, the touched plate is deformed sufficiently that it comes into contact with the other plate at the touch point. This touching of the plates allows the position at which the sensor is touched to be determined as described further below.

The position at which the sensor is touched is referred to below as the touch point T. In the following example, the X and Y co-ordinates of the touch point are defined in the directions indicated by the axis shown in FIG. 1, having an origin at one of the corners of the plates, indicated by 'O' in FIG. 1. With this definition of the co-ordinates, the top plate 3 shown in FIG. 1 is the X-plate and the bottom plate 4 is the Y-plate. Electrodes 5 and 6 are the X− and X+ electrodes respectively, while electrodes 4 and 8 are the Y− and Y+ electrodes respectively. It is understood that the co-ordinates may be defined in other ways.

Figure 2A:
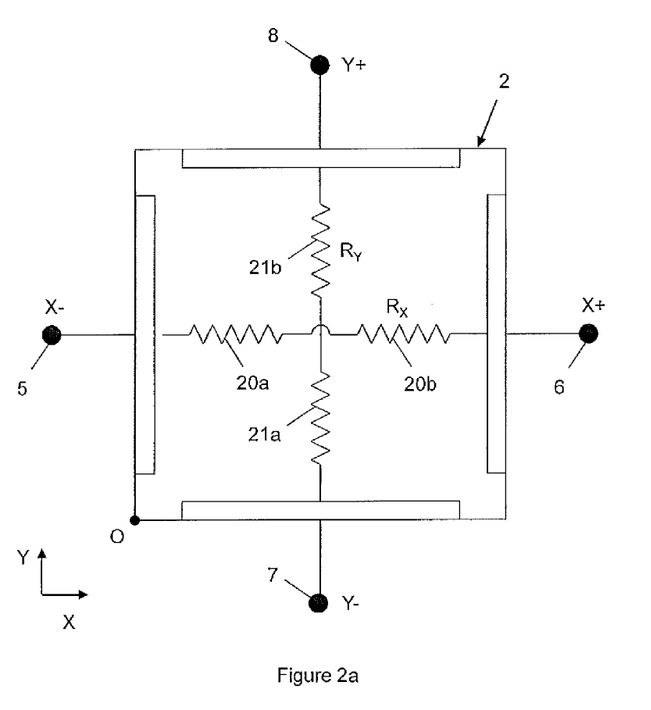
FIG. 2a illustrates a circuit formed by the touch-screen shown in FIG. 1 when not touched.

The resistive layer formed on each plate 3, 4 may be modelled electrically as a resistor (or equivalently as two or more resistors connected in series) connecting the two electrodes of the plate. FIG. 2a illustrates the circuit formed by the two plates 3, 4 when the sensor is not being touched, and therefore when the resistive layers are not in electrical contact with each other. As illustrated, the resistive coating of the X-plate 3 can be modelled as a first series of resistors 20a, 20b, connecting the X− and X+ electrodes 5, 6, and having a total resistance of Rx. Similarly, the resistive coating of the Y-plate 4 can be modelled as a second series of resistors 21a, 21b, connecting the Y− and Y+ electrodes 7, 8, and having a total resistance of $R_Y$. The resistance values $R_X$ and $R_Y$ depend on the total resistances of the respective layers of resistive material formed on the X-plate 3 and Y-plate 4. Since the plates 3, 4 are not touching at this time, there is no electrical connection between the two series of resistors $R_X$ 20a, 20b and $R_Y$ 21a, 21b.

Figure 2B:
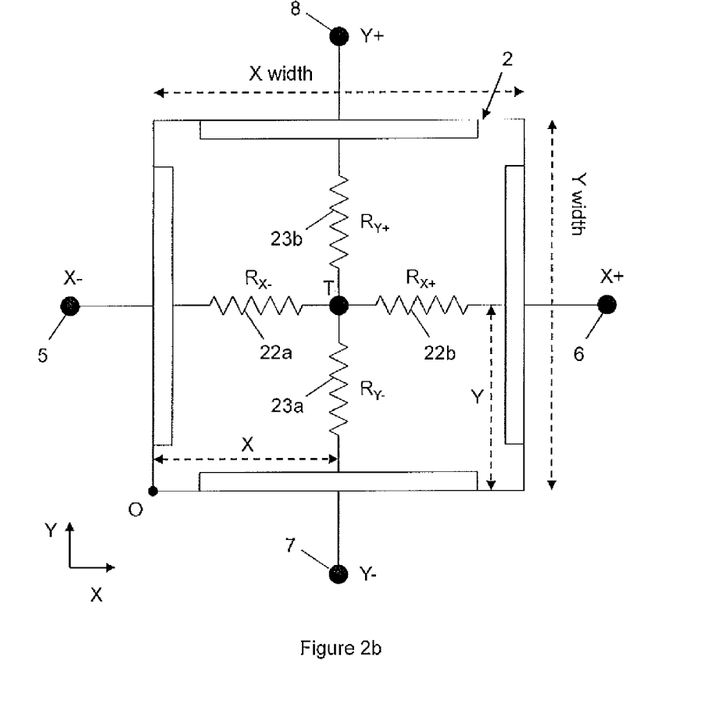
FIG. 2b illustrates a circuit formed by the touch-screen shown in FIG. 1 when touched.

FIG. 2b illustrates the circuit formed when the sensor 2 is touched at a touch point T having co-ordinates (X, Y). In the resistor model of the plates, this results in an electrical connection between the two series of resistors $R_X$ and $R_Y$ at the touch point T. In this case, the resistive layer of the X-plate 3 may be modelled as two resistors $R_{X-}$ 22a and $R_{X+}$ 22b in series connecting the X-plate electrodes 5, 6. The resistor $R_{X+}$ 22b is connected between the X+ electrode 6 and the touch point T, and the resistor $R_{X-}$ 22a is connected between the touch point T and the X− electrode 5. Similarly, the resistive layer of the Y-plate 4 may be modelled as two resistors $R_{Y-}$ 23a and $R_{Y+}$ 23b in series connecting the Y-plate electrodes 7, 8. The resistor $R_{Y+}$ 23b is connected between the Y+ electrode 8 and the touch point T, and the resistor $R_{Y-}$ 23a is connected between the touch point T and the Y− electrode 7. The values of $R_{X-}$ 22a, $R_{X+}$ 22b, $R_{Y-}$ 23a and $R_{Y+}$ 23b depend on the co-ordinates of the touch point T. However, the total resistances of the X-plate 3 and Y-plate 4 remain the same as before so that $R_{X-}+R_{X+}=R_X$ and $R_{Y-}+R_{Y+}=R_Y$ remain constant.

The resistances $R_{X-}$ 22a, $R_{X+}$ 22b, $R_{Y-}$ 23a and $R_{Y+}$ 23b are created by the portions of resistive material occurring between respective electrodes X− 5, X+ 6, Y− 7 and Y+ 8 and the touch point T. A greater width of resistive material produces a higher resistance. Furthermore, since the resistive layers comprise uniform resistive layers, the resistance of a portion of resistive material is proportional to its width (i.e. R∝W). As can be seen from FIG. 2b, the width $W_{X-}$ of the portion of resistive material corresponding to $R_{X-}$ 22a is the distance between the X− electrode 5 and the touch point T. This distance/width is proportional to the X co-ordinate of the touch point (i.e. $W_{X-} \propto X$). It can be seen, therefore, that the resistance value $R_{X-}$ 22a is proportional to the X co-ordinate of the touch point T (i.e. since $R_{X-} \propto W_{X-}$ and $W_{X-} \propto X$ then $R_{X-} \propto X$). Similarly, the width of the portion of resistive material corresponding to $R_{Y-}$ 23a is the distance between the Y− electrode 7 and the touch point. This distance/width is proportional to the Y co-ordinate of the touch point. It can be seen, therefore, that the resistance value $R_{Y-}$ 23a is proportional to the Y co-ordinate of the touch point T ($R_{Y-} \propto Y$). The constant of proportionality depends on the choice of units for the co-ordinates and the resistances.

Figure 2C:
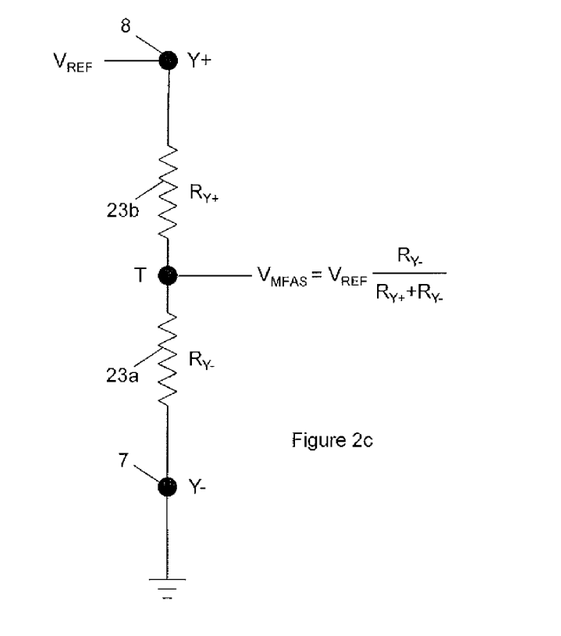
FIG. 2c illustrates a voltage divider circuit formed from the circuit shown in FIG. 2b.

Referring again to FIG. 2b, when a voltage is applied across the electrodes of one of the plates, for example the X-plate 3, a voltage divider circuit is formed. In this example the applied voltage is provided in the form of a constant DC signal of 2V, although other voltage values could be used. FIG. 2c illustrates the equivalent voltage divider circuit in the case that a constant voltage $V_{REF}$ is applied across the electrodes 5, 6 of the X-plate 3. Specifically, the X+ electrode 6 is connected to the positive constant reference voltage $V_{REF}$ and the X− electrode 5 is connected to ground. The electrical connection between the plates 3, 4 at the touch point T acts to divide the applied voltage $V_{REF}$, creating a divided voltage $V_{XMEAS}$ measured at the touch point T. The voltage $V_{XMEAS}$ may be measured using either of the Y− or Y+ electrodes 7, 8, since at this stage no voltage is applied across these electrodes. The measured voltage $V_{XMEAS}$ is given by the following formula in accordance with voltage divider circuit theory.

$$V_{XMEAS} = V_{REF} \frac{R_{X-}}{R_{X+} + R_{X-}} \propto X$$

Since $V_{REF}$ and the sum $R_{X+}+R_{X-}=R_X$ are constant, and $R_{X-}$ is proportional to the X co-ordinate, this expression shows that the measured voltage $V_{XMEAS}$ is also proportional to the X co-ordinate. Another way of looking at this relationship is the following. Since the resistive layer on the X-plate 3 is a uniform resistive layer, the voltage measured at a point on the X-plate 3 increases linearly in the X-direction moving from the X− electrode 5 (at ground) to the X+ electrode 6 (at voltage $V_{REF}$). The voltage measured at the touch point T (with respect to ground), $V_{XMEAS}$, is therefore proportional to the distance between the X− electrode 5 and the touch point T. Furthermore, the distance between the X− electrode 5 to the touch point T is proportional to the X co-ordinate of the touch point. This means that $V_{XMEAS}$ is proportional to the X co-ordinate of the touch point, or conversely, the X co-ordinate is proportional to the measured voltage $V_{MEAS}$.

The constant of proportionality depends on the choice of units for the X co-ordinate and the voltage measurement. In one arrangement, the constant of proportionality is chosen such that the X co-ordinate is equal to $X_{MAX}$ when the measured voltage $V_{XMEAS}$ is equal to $V_{REF}$. $X_{MAX}$ represents the maximum value for the X co-ordinate and corresponds to the X co-ordinate of the edge of the sensor on which the X+ electrode lies. With these definitions, the X co-ordinate of the touch point T is given by the voltage ratio ($V_{XMEAS}/V_{REF}$) multiplied by $X_{MAX}$.

Similarly, after removing the voltage across the X-plate electrodes 5, 6, if the Y+ electrode 8 is connected to a positive constant reference voltage $V_{REF}$ and the Y− electrode 7 is connected to ground, the voltage $V_{YMEAS}$ measured at the touch point T is given by the following formula.

$$V_{YMEAS} = V_{REF} \frac{R_{Y+}}{R_{Y+} + R_{Y-}} \propto Y$$

In this case, the voltage $V_{YMEAS}$ may be measured using either of the X+ or X− electrodes 6, 5, since at this stage no voltage is applied across these electrodes. For the same reasons given above, the measured voltage $V_{YMEAS}$ is proportional to the Y co-ordinate of the touch point. If the constant of proportionality is chosen such that the Y co-ordinate is equal to $Y_{MAX}$ when the measured voltage $V_{YMEAS}$ is equal to $V_{REF}$ then the Y co-ordinate of the touch point T is given by the voltage ratio ($V_{YMEAS}/V_{REF}$) multiplied by $Y_{MAX}$. $Y_{MAX}$ represents the maximum value for the Y co-ordinate and corresponds to the Y co-ordinate of the edge of the sensor on which the Y+ electrode lies.

The X and Y co-ordinates may be normalised as appropriate to ensure that the co-ordinate values fall within a desired range. For example, if the resolution of the sensor in the X and Y directions is equal to $RES_X$ and $RES_Y$ respectively, then the value of $X_{MAX}$ and $Y_{MAX}$ may be set to $2^{RESX}$ and $2^{RESY}$ respectively. A sensor having an 8×8 resolution would therefore output co-ordinate values being integers in the range 0 to 256.

Figure 3:
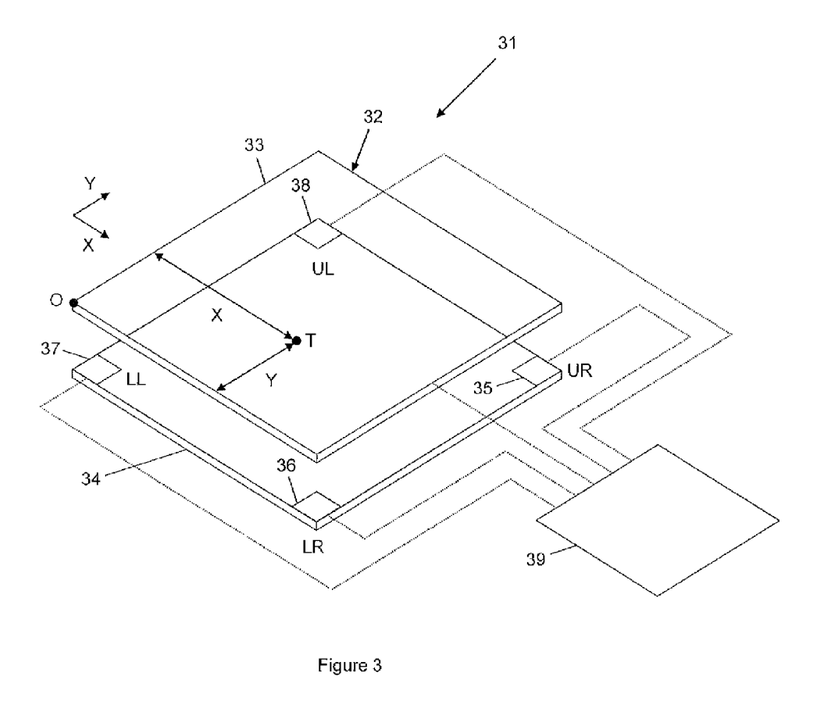
FIG. 3 illustrates the principles of a 5-wire touch-screen arrangement.

A 5-wire resistive touch-screen is illustrated in FIG. 3. Like the 4-wire arrangement shown in FIG. 1, the 5-wire arrangement 31 comprises a sensor 32 including two plates 33, 34 and a controller 39. A surface of one of the plates 34 is coated with a resistive material, such as ITO, to form a uniform resistive layer, and an opposing surface of the other plate 33 is coated with a conducting layer, such as a metal layer. For example, the underside of the top plate 33 shown in FIG. 3 comprises a conducting layer while the upper side of the bottom plate 34 comprises a resistive layer. If the sensor 32 is to be mounted on a display, both the resistive layer of one plate, the conducting layer of the other plate and the plate substrates are transparent.

The plate 34 comprising the resistive layer (referred to below as the resistive plate) includes four electrodes, UR 35, LR 36, LL 37 and UL 38, each one formed at a respective corner of the resistive plate 34. In this example, the electrodes 35, 36, 37, 38 are arranged in the order UR 35, LR 36, LL 37 and UL 38 moving clockwise or anti-clockwise (depending on the viewpoint) around the corners of the resistive plate 34. The conducting layer of the other plate 33 (referred to below as the conductive plate) functions as a fifth electrode and is sometimes referred to as the wiper electrode W. The four electrodes UR 35, LR 36, LL 37 and UL 38 are each connected to a respective output of the controller 39. The wiper electrode W is connected to an input of the controller 39.

The principle of operation of the 5-wire arrangement 31 is similar in many respects to that of the 4-wire arrangement 1. In use, a voltage is applied across the resistive layer in either the X or Y direction by biasing the four electrodes UR 35, LR 36, LL 37 and UL 38 appropriately. In this example, the X and Y co-ordinates of the touch point are defined in the directions indicated by the axis shown in FIG. 3, having an origin at one of the corners of the plates, indicated by 'O' in FIG. 3. To measure the X co-ordinate, a voltage may be applied in the X-direction by connecting electrodes UR 35 and LR 36 (located on one edge of the plate) to a positive reference voltage $V_{REF}$ and connecting electrodes LL 37 and UL 38 (located on the opposing edge of the plate) to ground. In this step, the UR 35 and LR 36 electrodes together perform a similar function to the X+ electrode 6 in the 4-wire arrangement 1, while the LL 37 and UL 38 electrodes together perform a similar function to the X− electrode 5. The wiper electrode W performs a similar measuring function to the Y+ or Y− electrodes 8, 7 in the 4-wire arrangement 1.

By biasing the electrodes 35, 36, 37, 38 in the manner described, a linear voltage increase is created across the resistive plate 34 in the X-direction. When the conductive plate 33 is touched, the wiper electrode comes into electrical contact with the resistive layer formed on the resistive plate 34 at the touch point T. As with the 4-wire arrangement 1, this creates a voltage divider circuit in which the applied voltage is divided by the wiper electrode. The divided voltage $V_{WXMEAS}$ as measured by the wiper electrode is proportional to the X co-ordinate of the touch point T. The X co-ordinate is given by the voltage ratio $V_{WXMEAS}/V_{REF}$ multiplied by $X_{MAX}$.

Once the X co-ordinate has been determined, the Y co-ordinate is determined by biasing the resistive layer in the Y-direction. For example, a voltage is applied in the Y-direction by connecting electrodes UL 38 and UR 35 (located on one edge of the plate) to a positive reference voltage $V_{REF}$ and connecting electrodes LL 37 and LR 36 (located on the opposing edge of the plate) to ground. In this step, the UL 38 and UR 35 electrodes together perform a similar function to the Y+ electrode 8 in the 4-wire arrangement 1, while the LL 37 and LR 36 electrodes together perform a similar function to the Y− electrode 7. The wiper electrode W performs a similar measuring function to the X+ or X− electrodes 6, 5 in the 4-wire arrangement 1. A linear voltage increase is thus created across the resistive plate 34 in the Y-direction which is divided by the wiper electrode when the sensor 32 is touched. The divided voltage $V_{WYMEAS}$ as measured by the wiper electrode is proportional to the Y co-ordinate of the touch point T. The Y co-ordinate is given by the voltage ratio $V_{WYMEAS}/V_{REF}$ multiplied by $Y_{MAX}$.

Other arrangements of sensor are also possible. For example, 7-wire and 9-wire touch-screen sensors comprise variants of the 4-wire and 5-wire arrangements described above.

Figure 2D:
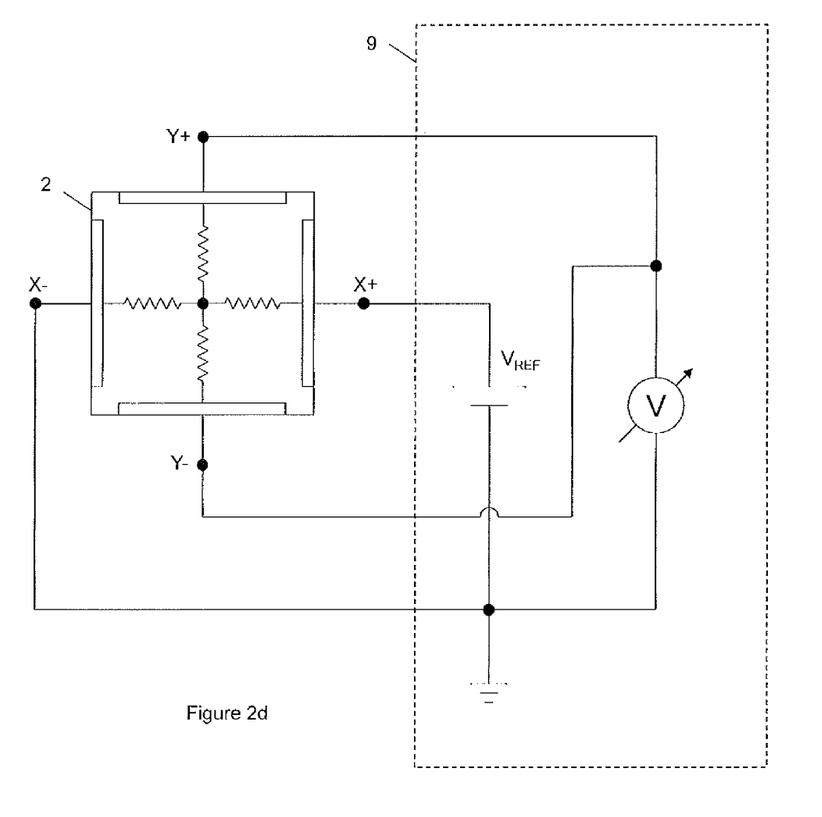
FIG. 2d illustrates a circuit for measuring the X co-ordinate of a touch point for the touch-screen shown in FIG. 1.

The application and measurement of voltages is performed by the controller 9, 39. For example, FIG. 2d illustrates the circuit configuration of the sensor 2 and controller 9 in the 4-wire arrangement 1 for performing the voltage application and measurement for determining the X co-ordinate.

In the touch-screen apparatus described above, measurements of the X and Y co-ordinates are taken successively. For example, in the 4-wire arrangement 1, a voltage is applied across the electrodes of one of the plates to measure one of the co-ordinates, then a voltage is applied across the electrodes of the other plate to measure the other co-ordinate. In the 5-wire arrangement 31, a voltage is applied across the resistive plate 34 in one direction to measure one of the co-ordinates then a voltage is applied across the resistive plate 34 in the other direction to measure the other co-ordinate. This process is repeated for each positional measurement required. A typical touch-screen device produces between 100 and 1000 co-ordinate pair measurements per second.

Once the co-ordinates of the touch point have been determined, it is also possible to determine the touch pressure. When the sensor is touched, a resistance is created at the touch point between the plates of the sensor and it is possible to calculate this touch resistance, and hence the touch pressure, once the co-ordinates of the touch point are known.

In some touch-screen designs, it may be desirable to perform a calibration procedure, for example involving the user touching a series of pre-defined position on the touch-screen.

By measuring the resulting outputs and comparing with the expected values, the controller 9, 39 is able to calculate offsets and other compensation values to correct for various errors during use.

Figure 4:
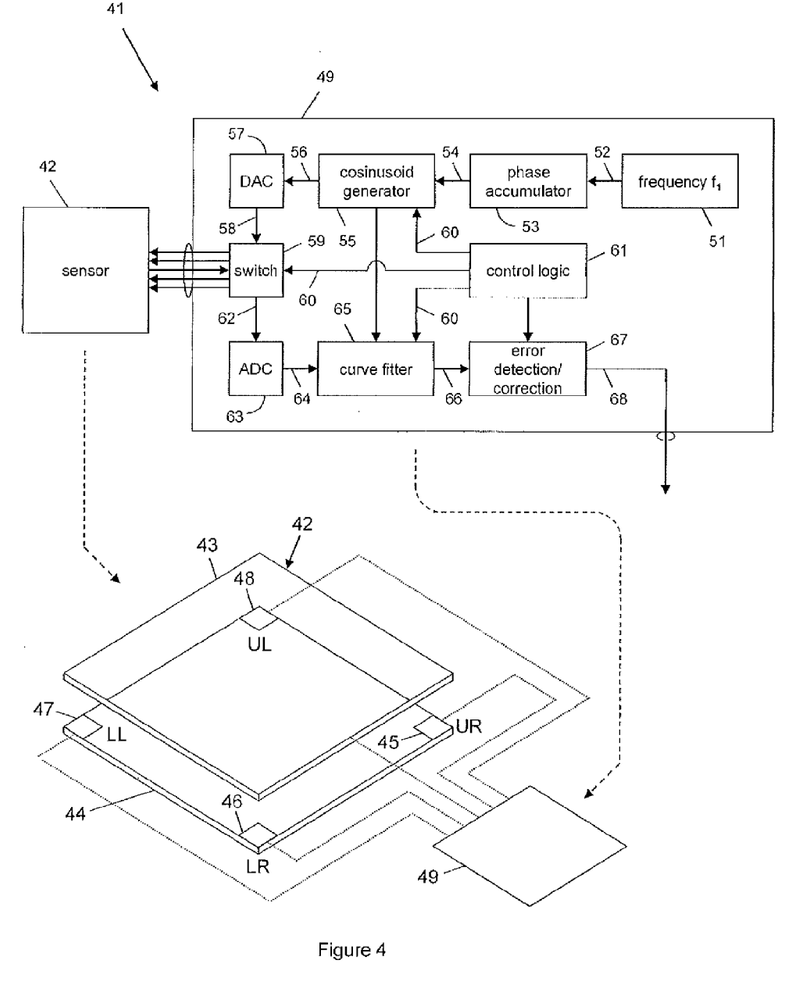
FIG. 4 illustrates a touch-screen arrangement according to an embodiment of the invention.

FIG. 4 illustrates a system in which the effects of noise may be reduced and in which measurements of the X and Y co-ordinates may be taken simultaneously. Briefly, the voltage signals applied to the electrodes of the touch-screen sensor 41 are of a form which makes it easier to distinguish the signals from noise. This allows the power of the applied signals to be reduced, thereby lowering power consumption while maintaining sensor accuracy and resolution. In one embodiment, sinusoidal or cosinusoidal voltages are used as the input signals. In another embodiment, the input signals are spread-spectrum-coded sequences. Advantageously, two input signals can be applied to the touch-screen sensor simultaneously, thereby allowing simultaneous measurement of the X and Y co-ordinates. This reduces the latency of the system. The application of two signals simultaneously is made possible by using signals of a form which allows the controller to distinguish the different input signal components present in the measured output signal. For example, sinusoidal voltages of different frequencies, or different spread-spectrum codes may be used for the two input signals.

The system 41 shown in FIG. 4 comprises a 5-wire touch-screen sensor 42 and a controller 49. It is understood that embodiments of the invention are applicable to other designs of touch-screen sensors, including 4-wire sensors. The touch screen sensor 42 shown in FIG. 4 is of the same or similar construction to the sensor 32 illustrated in FIG. 3. In this example, the X and Y co-ordinates of the touch point are defined in the directions indicated by the axis shown in FIG. 4, having an origin at one of the corners of the plates, indicated by 'O' in FIG. 4. The four electrodes UR 45, LR 46, LL 47 and UL 48 of the touch-screen sensor 42 (referred to below generally as input electrodes) are connected to four outputs of the controller 49. The wiper electrode is connected to an input of the controller 49. As described in greater detail below, the controller 49 is arranged to generate and apply voltage signals to the input electrodes 45, 46, 47, 48 and to measure the resulting output voltage at the wiper electrode. From this measurement, the controller 49 is arranged to derive touch point co-ordinate information. The reference voltages applied to the input electrodes 45, 46, 47, 48 are referred to below as pilot signals, being a known signal.

In the examples described below, two pilot signals comprising cosinusoidal voltage signals of different frequencies are simultaneously applied to the input electrodes 45, 46, 47, 48. It is understood that other forms of pilot signal can be used in alternative embodiments. For example, references below to cosinusoidal signals also include sinusoidal signals, and vice versa. Furthermore, while the advantage of reduced latency is achieved by applying two pilot signals simultaneously, significant reductions in power consumption can be achieved whether the pilot signals are applied simultaneously or sequentially.

The generation and application of the pilot signals is performed by the controller 49. In the described embodiment, a cosinusoidal waveform is generated by the controller 49 using Direct Digital Synthesis (DDS) using a oscillator 51, phase accumulator 53 and sinusoid generator 55. The oscillator 51 provides clock signals 52 of frequency $f_1$ to the phase accumulator 53. The phase accumulator 53 comprises a counter which increments by a particular amount each time a clock signal 52 is received, and which wraps back to zero when a maximum value is reached. The counter value thus increments at a steady rate, periodically wrapping back to zero, and provides the phase parameter for the cosinusoidal waveform generated by the controller 49.

The counter value is provided as an input 54 to the cosinusoid generator 55 which calculates and outputs a value 56 which is a cosinusoidal function of the input 54. For example, in one embodiment, the cosinusoid generator 55 generates an output value 56 $y=A\cos(n*2\pi/N)$ where n is the input counter value 54, N is the maximum counter value, and A is a constant which determines the amplitude of the cosinusoid. The cosinusoid function may be computed using any suitable technique, such as the Coordinate Rotation Digital Computer (CORDIC) algorithm. The counter value n is multiplied by the normalising factor $2\pi/N$ to ensure that the argument of the cosinusoidal function falls within the range 0 to $2\pi$ as the counter value increments in the range 0 to N. The cosinusoidal waveform thus generated has a frequency which matches the wrap-around frequency of the phase accumulator counter. The frequency of the generated cosinusoid may be varied by varying the frequency ($f_1$) of the clock signals 54 provided to the phase accumulator 53, the maximum value of the phase accumulator counter (N) and/or the amount by which the counter is incremented upon receiving each clock signal 52.

As the counter value increases, the output 56 of the cosinusoid generator 55 comprises a series of digital values representing the value of a cosinusoidal waveform at gradually increasing phases between 0 and $2\pi$. These values are input into a digital to analogue converter (DAC) 57 which converts the digital values into an analogue voltage signal 58 of the form $P_1=V_{REF}\cos(\omega_1 t)$ having frequency $\omega_1$ and amplitude $V_{REF}$. This voltage signal 58 forms the first pilot signal $P_1$. The analogue pilot signal 58 output from the DAC 57 is provided to a switch 59 which is arranged to route the pilot signal $P_1$ to the controller output that is connected to the appropriate input electrode of the sensor 42. The particular electrode which receives the first pilot signal $P_1$ is described in greater detail below.

As can be seen in FIG. 4, various components of the controller 49, such as the cosinusoid generator 55, switch 59 and a curve fitter 65 (described in greater detail below), are controlled by control signals 60 output by control logic 61.

The controller 49 is also arranged to generate a second cosinusoidal voltage signal $P_2=V_{REF}\cos(\omega_2 t)$ in the same way as described above, except that the frequency of the second cosinusoid, $\omega_2$, is different to that of the first, $\omega_1$. This voltage signal forms the second pilot signal $P_2$. In order to generate the second pilot signal $P_2$, the controller 49 comprises a second oscillator (not shown) having a frequency $f_2$ and a second phase accumulator (not shown). In this embodiment, the cosinusoid generator 55 is used to compute the cosinusoidal values for both the first and second pilot signals. The second pilot signal $P_2$ is provided to the switch 59 which routes the signal to the controller output that is connected to the appropriate input electrode of the sensor 42.

The application of the pilot signals $P_1$ and $P_2$ to the input electrodes 45, 46, 47, 48 is performed by the controller 49 in the following way. One of the electrodes is chosen to be connected to ground. One of the first or second pilot signals $P_1$ or $P_2$ is applied to the next electrode in a clockwise direction around the resistive plate 44 starting from the grounded electrode. The other of the first or second pilot signals $P_2$ or $P_1$ is applied to the next electrode in an anti-clockwise direction around the resistive plate 44 starting from the grounded electrode. For example, referring to FIG. 4, the LL electrode 47 is connected to ground, the first pilot signal $P_1$ is applied to the UL electrode 48 and the second pilot signal $P_2$ is applied to the LR electrode 46. In general, it does not matter which electrode is connected to ground. However, the relative order of the signals applied to the electrodes is controlled. With these input voltages, the resulting voltage occurring at the remaining input electrode UR 45 is equal to the sum of the two pilot signals $P_1+P_2$. The wiper electrode is used to collect samples of the voltage measured at the touch point T for the purpose of deriving co-ordinate information.

Since the resistive layer is formed as a uniform layer, there will be linear changes in voltage across the surface of the layer in both the X and Y directions. Therefore, the expression for the voltage $V_{MEAS}$ measured at a point having co-ordinates (X,Y) will be linear in both of the co-ordinate parameters X and Y. By imposing the boundary conditions that the voltages at each of the input electrode 45, 46, 47, 48 are those given above, the voltage $V_{WMEAS}$ is given by the following expression.

$$V_{MEAS}(t) = \frac{X}{X_{MAX}} V_{UL} + \frac{Y}{Y_{MAX}} V_{LR} = \frac{X}{X_{MAX}} P_1(t) + \frac{Y}{Y_{MAX}} P_2(t) =$$
$$\frac{X}{X_{MAX}} V_{REF}\cos(\omega_1 t) + \frac{Y}{Y_{MAX}} V_{REF}\cos(\omega_2 t) = A_1 P_1(t) + A_2 P_2(t)$$

In this expression, $X_{MAX}$ is the maximum value for the X co-ordinate and $Y_{MAX}$ is the maximum value for the Y co-ordinate. $V_{UL}$ is the voltage applied to the UL electrode 48 and $V_{LR}$ is the voltage applied to the LR electrode 46. Since the applied voltages $V_{UL}$ and $V_{LR}$ are time-varying quantities, the measured voltage $V_{MEAS}$ is also a time-varying quantity.

When the sensor is touched, the plate being touched deforms and comes into contact with the other plate. In particular, the wiper electrode will make electrical contact with the resistive layer at the touch point T having co-ordinates (X,Y). The voltage measured at the touch point T by the wiper electrode $V_{MEAS}$ is given by the above expression. It can be seen that the measured signal $V_{MEAS}$ is equal to the sum of the input pilot signals $P_1$ and $P_2$, attenuated by respective factors $A_1=X/X_{MAX}$ and $A_2=Y/Y_{MAX}$ which depend linearly on the respective co-ordinate X and Y of the touch point T. Therefore, if the degree of attenuation of the two pilot signal components $P_1$ and $P_2$ present in the measured signal $V_{MEAS}$ can be determined, the co-ordinates of the touch point T can be calculated. The wiper electrode is connected to an input of the controller 49 which is capable of analysing the measured signal $V_{MEAS}$ and of performing the necessary calculations to determine the co-ordinates (X, Y) of the touch point T.

One way to determine the attenuation of the pilot signal components is to fit a theoretical curve to the measured output signal $V_{MEAS}$. The theoretical curve is one that is expected based on the known input pilot signals $P_1$ and $P_2$. The expected output is in the following form.

$$V_{EXPT}(t) A_1 P_1(t) + A_2 P_2(t)$$

The pilot signals $P_1$ and $P_2$ are known while the attenuation factors $A_1$ and $A_2$ are unknown and need to be determined. The values $A_1$ and $A_2$ may be found by selecting values such that the measured output signal $V_{MEAS}(t)$ best fits the theoretical curve $V_{EXPT}(t)$. One way to achieve this is to take samples of the measured voltage $V_{MEAS}$ and to select attenuation factors $A_1$ and $A_2$ such that the differences between the samples and the corresponding values of the theoretical curve are minimised.

The measured voltage signal $V_{MEAS}$ is sampled at time intervals to generate a sequence of m samples $y_1, y_2, \ldots, y_m$ taken at times $t_1, t_2, \ldots, t_m$. In order to generate the samples, the analogue voltage signal measured at the wiper electrode is provided to the switch 59 of the controller 49 which routes the signal on line 62 to an analogue to digital converter (ADC) 63. The ADC 63 outputs a sequence of digital values 64 representing the samples.

Values for the attenuation factors $A_1$ and $A_2$ are then chosen such that the value $\Delta$, given by the following expression, is minimised.

$$\Delta = \sum_{i=1}^{m} (y_i - V_{EXPT}(t_i))^2 \qquad \text{Eq. 1}$$

Substituting the expression for $V_{EXPT}(t)$ for this specific example into equation 1 gives the following expression for $\Delta$.

$$\Delta = \sum_{i=1}^{m} (y_i - A_1 V_{REF}\cos(\omega_1 t_i) - A_2 V_{REF}\cos(\omega_2 t_i))^2$$

Any suitable curve-fitting procedure may be used, one of which is described in greater detail below. Since $A_1=X/X_{MAX}$ and $A_2=Y/Y_{MAX}$, once the attenuation factors $A_1$ and $A_2$ have been determined, the X and Y co-ordinates are given respectively by $X=A_1 X_{MAX}$ and $Y=A_2 Y_{MAX}$.

The above process is repeated for each co-ordinate measurement so that a new set of samples is taken, and curve fitting process performed for each co-ordinate measurement. As illustrated in FIG. 4, the curve fitting process is performed by a curve fitter 65 which receives the samples 64 from the ADC 63 and provides an output 66 including the calculated co-ordinates (X, Y). The output 66 of the curve fitter 65 is provided to an error detection and correction block 67. This block 67 is arranged to detect and correct any errors in the calculated co-ordinated values, for example to correct errors determined in the calibration process mentioned above. The output 68 of the error detection and correction block 67 comprises corrected co-ordinate values which are output from the controller 49 and may be supplied to any components which require them, such as a processor (not shown).

It is understood that the pilot signals $P_1$ and $P_2$ need not be applied simultaneously, and could instead be applied sequentially, although this would result in increased latency. If the pilot signals are not applied simultaneously, then the pilot signals $P_1$ and $P_2$ need not be different. For example, both pilot signals may have the same frequency. Furthermore, while the above process has been described in relation to a 5-wire resistive touch-screen. The pilot signals may also be use in relation to other designs of touch-screen. For example, in the case of a 4-wire design, a process similar to that described above in relation to FIG. 1 may be performed except that the pilot signals $P_1$ and $P_2$ are applied to the electrodes instead of constant DC voltage signals.

For example, to determine the X co-ordinate in the 4-wire arrangement 1, one of the first or second pilot signals $P_1$ or $P_2$ is applied to the X+ electrode 6 while the X− electrode 5 is coupled to ground. A voltage is not applied across the Y+ and Y− electrodes 8, 7 in this step. If the first pilot signal $P_1$ is used, the expected voltage $V_{XEXPT}$ measured by either the Y+ or Y− electrode 8, 7 at the touch point T having co-ordinates (X,Y) is given by the following expression.

$$V_{XEXPT}(t) = \frac{X}{X_{MAX}} P_1(t) = \frac{X}{X_{MAX}} V_{REF}\cos(\omega_1 t) = A_1 P_1(t)$$

The first pilot signal $P_1$ is attenuated by a factor $A_1 = X/X_{MAX}$ which depends linearly on the X co-ordinate of the touch point T. The second pilot signal $P_2$ is not applied in this step and so does not contribute to the measured output signal. The attenuation factor $A_1$ may be determined by selecting a value such that the measured signal best fits the expected theoretical output. Once the attenuation factor $A_1$ is determined, the X co-ordinate is calculated using $X = A_1 X_{MAX}$.

Next, to determine the Y co-ordinate, one of the first or second pilot signals $P_1$ or $P_2$ is applied to the Y+ electrode 8 while the Y− electrode 7 is coupled to ground. A voltage is not applied across the X+ and X− electrodes 6, 5 in this step. If the second pilot signal $P_2$ is used, the expected voltage measured by either the X+ or X− electrode 6, 5 at the touch point T having co-ordinates (X,Y) is given by the following expression.

$$V_{YEXPT}(t) = \frac{Y}{Y_{MAX}} P_2(t) = \frac{Y}{Y_{MAX}} V_{REF} \cos(\omega_2 t) = A_2 P_2(t)$$

The second pilot signal $P_2$ is attenuated by a factor $A_2 = Y/Y_{MAX}$ which depends linearly on the Y co-ordinate of the touch point T. The first pilot signal $P_1$ is not applied in this step and so does not contribute to the measured output signal. The attenuation factor $A_2$ may be determined by selecting a value such that the measured signal best fits the expected theoretical output. Once the attenuation factor $A_2$ is determined, the Y co-ordinate is calculated using $Y = A_2 Y_{MAX}$.

As in the previous example, the attenuation factors $A_1$ and $A_2$ are chosen to minimise the value $\Delta$, given by equation 1 above, where $V_{EXPT}(t)$ is either $V_{XEXPT}(t)$ or $V_{YEXPT}(t)$ depending on which co-ordinate is being calculated.

One problem arises when determining the attenuation factors $A_1$ and $A_2$ in the process described above. Touch-screen sensors have a finite bandwidth, typically in the region of 50 kHz, which results in a non-zero phase shift occurring between the input signals and the output signal. If the desired resolution of the sensor is low and the bandwidth relatively high, the phase shift can be ignored without impacting significantly on accuracy. However, if either the desired resolution is high or the bandwidth is relatively low, the phase shift needs to be taken into account to obtain accurate co-ordinate information.

The phase shift mentioned above can be taken into account by splitting the output signal into two components that are 90 degrees out of phase. The attenuation factors of these out-of-phase components are determined separately and then the overall attenuation factor for each pilot signal can be calculated from these values. For example, any individual term in the expression for the expected signal $V_{EXPT}(t)$ having a cosinusoidal form $a \cdot \cos(\theta + \phi)$, where $\phi$ is an unknown phase factor, may be separated into a sinusoidal component and a cosinusoidal component using the following trigonometric identity.

$$a\cos(\theta + \varphi) = b \cdot \cos(\theta) - c \cdot \sin(\theta)$$
$$a = \sqrt{b^2 + c^2}$$
$$\tan(\varphi) = \frac{c}{b}$$

It can be seen that splitting the output signal in this way effectively removes the unknown phase factor $\phi$.

For example, in the case of a 5-wire arrangement in which sinusoidal pilot signals $P_1$ and $P_2$ having frequencies $\omega_1$ and $\omega_2$ are applied simultaneously, the expected output signal $V_{EXPT}(t)$ will be of the following form.

$$V_{EXPT}(t) = A_1 V_{REF} \cos(\omega_1 t_i + \phi_1) + A_2 V_{REF} \cos(\omega_2 t_i + \phi_2)$$

The phase shifts $\phi_2$ and $\phi_2$ associated with respective pilot signals $P_1$ and $P_2$ are unknown and may be different. Each cosinusoidal term in this expression may be split into components that are 90 degrees out of phase using the trigonometric identity described above. This results in the following equivalent expression for the expected output signal.

$$V_{EXPT}(t) = V_{REF}[A_{11}\cos(\omega_1 t) - A_{12}\sin(\omega_1 t) + A_{21}\cos(\omega_2 t) - A_{22}\sin(\omega_2 t)]$$

Where the attenuation factors $A_{11}, A_{12}, A_{21}$ and $A_{22}$ satisfy the following relationships.

$$A_1 = \sqrt{A_{11}^2 + A_{12}^2}$$
$$A_2 = \sqrt{A_{21}^2 + A_{22}^2}$$
$$\tan(\varphi_1) = \frac{A_{12}}{A_{11}}$$
$$\tan(\varphi_2) = \frac{A_{22}}{A_{21}}$$

The curve fitting procedure described above can then be applied to this expression for $V_{EXPT}(t)$ to find the values for $A_{11}, A_{12}, A_{21}$ and $A_{22}$ such that the measured output most closely matches the expected output. Specifically, the values for $A_{11}, A_{12}, A_{21}$ and $A_{22}$ are chosen to minimise the value $\Delta$, given by equation 1 above. The values for the attenuation factors $A_1$ and $A_2$ may then be calculated from the values found for $A_{11}, A_{12}, A_{21}$ and $A_{22}$ which in turn can be used to calculate the X and Y co-ordinate values.

In addition to a phase shift $\phi$, a constant, C, may be added to the expression for the expected output signal $V_{EXPT}(t)$. This may be done to model an offset for the output signal, corresponding to a DC component of the signal. By adding this constant, a good estimate for the output signal is achieved. This in turn allows an error signal (which may be referred to as residue) to be monitored, and a detection of a growth in the error signal may be used to signal erroneous behaviour. In this case, the expression for the expected output is the following.

$$V_{EXPT}(t) = V_{REF}[A_{11}\cos(\omega_1 t) - A_{12}\sin(\omega_1 t) + A_{21}\cos(\omega_2 t) - A_{22}\sin(\omega_2 t)] + C$$

The value to be minimised $\Delta$ is given by substituting this expression into equation 1 above.

In one embodiment, the touch-screen controller operates in a three-phase mode of operation. The first phase is used to detect whether a touch is made or not and phases two and three perform measurements of the X and Y co-ordinates of the touch point. If the co-ordinates are measured simultaneously then phases two and three may be merged into a single co-ordinate measuring phase. Touch detection in first phase may be performed using dedicated touch sensing circuitry which detects touches, but does not determine the actual co-ordinate information. After the touch detection phase, if a touch is detected then the controller proceeds to the subsequent co-ordinate measuring phases to determine the X and Y co-ordinates of the touch point. After the co-ordinates are determined, the controller returns to the touch detection phase and the process is repeated. If the touch is lost, the controller may decide to stay in the touch detection phase.

Since most of the operation typically occurs in the touch detection phase, it may be advantageous to optimise this phase to have as low a power consumption as possible, or preferably to eliminate the touch detection phase completely.

In some embodiments of the invention, the phase difference between an input pilot signal and the output signal may be used to determine whether a touch is made or not. For example, in a typical touch-screen arrangement there is a small leakage through the panel from its input to the input of the ADC in the controller. The leakage takes place via a capacitive feed forward path which results in the leaked component being 90° out of phase with the input signal when the sensor is not touched. However, when the sensor is touched, the phase difference reduces significantly, for example to less than 10°. This difference allows a touch to be detected. Since the phase between input and output signals may be derived during the co-ordinate measuring process, touch detection may be performed during the co-ordinate measuring phase. This allows the amount of time spent in a dedicated touch detection phase to be reduced. In some embodiments, dedicated circuitry to perform touch detection may not be required at all and a dedicated touch detection phase may be eliminated completely.

In one embodiment, touch detection can be established in a first phase using any suitable technique, for example using dedicated touch detection circuitry. If a touch is detected during this phase then co-ordinate measurements are made in one or more further co-ordinate measuring phases. During the co-ordinate measurement process, a phase difference between input and output signals may be derived. This in turn allows the controller to determine whether a touch is still occurring at the end of the co-ordinate measurement. This means that it is not necessary to return to the touch detection phase since the decision as to whether a touch is still occurring has already been made. This allows for a more continuous operation and reduced latency. In one embodiment, the touch detection phase may be eliminated completely by using a co-ordinate measurement phase as the touch detection phase. This allows the dedicated touch detection circuitry to be eliminated.

One way in which to determine the values for the attenuation parameters will now be described. In this example, the following matrices are defined.

$$M = \begin{vmatrix} \cos(\omega_1 t_1) & -\sin(\omega_1 t_1) & \cos(\omega_2 t_1) & -\sin(\omega_2 t_1) & 1 \\ \cos(\omega_1 t_2) & -\sin(\omega_1 t_2) & \cos(\omega_2 t_2) & -\sin(\omega_2 t_2) & 1 \\ \vdots & \vdots & \vdots & \vdots & \vdots \\ \vdots & \vdots & \vdots & \vdots & \vdots \\ \cos(\omega_1 t_m) & -\sin(\omega_1 t_m) & \cos(\omega_2 t_m) & -\sin(\omega_2 t_m) & 1 \end{vmatrix}$$

$$Y = \begin{vmatrix} y_1 \\ y_2 \\ \vdots \\ \vdots \\ y_m \end{vmatrix} \text{ and } X = \begin{vmatrix} V_{REF} A_{11} \\ V_{REF} A_{12} \\ V_{REF} A_{21} \\ V_{REF} A_{22} \\ C \end{vmatrix}$$

In matrix notation, the value to be minimised $\Delta$ is given by the following equation, as can be verified by substitution.

$$\Delta = (Y-MX)^T(Y-MX)$$

The notation T is the matrix transpose operator. This value is minimised when $\Delta$ is equal to zero. Setting the above expression equal to zero and solving for X leads to the following expression, as can be verified by substitution.

$$X = (M^T M)^{-1}(M^T Y)$$

The notation $-1$ is the matrix inverse operator. The first four elements of X thus calculated give the values for $A_{11}, A_{12}, A_{21}$ and $A_{22}$, each multiplied by $V_{REF}$, and the last element of X gives the value for the constant C. The attenuation parameters $A_1$ and $A_2$ are given by the following expressions.

$$A_1 = \sqrt{A_{11}^2 + A_{12}^2}$$
$$A_2 = \sqrt{A_{21}^2 + A_{22}^2}$$

Finally, the X and Y co-ordinates are given respectively by $X = A_1 X_{MAX}$ and $Y = A_2 Y_{MAX}$.

The frequency at which the measured voltage signal samples are taken may be selected as appropriate for a particular application. For example, in some applications, it may be necessary to set the number of co-ordinate measurements taken per second, and the number of samples taken per co-ordinate measurement, to specific values. If 1000 co-ordinate pairs per second are required then a co-ordinate measurement is taken every 1 ms. If $2^6=64$ samples are taken for each co-ordinate measurement then the time between successive samples is 1 ms/64≈16 μs. The time required to collect samples for one co-ordinate measurement is referred to below as the sample time or sample period. The time between successive samples is referred to below as the sample interval. The sample time is thus equal to the number of samples taken per co-ordinate measurement multiplied by the sample interval. It is understood that any suitable values for the sample time, sample interval and numbers of samples taken per co-ordinate measurement may be used and are not limited to the specific examples given. It is not necessary that the samples are taken at any particular phase of the output voltage signal. For example, it is not required that the samples coincide with peaks and/or troughs of the output signal.

As mentioned above, one problem with touch-screen sensors is the presence of noise. There are several ways in which the effects of noise can be reduced. For example, a touch-screen sensor's resistance to noise can be enhanced by increasing the resistance of the resistive layers applied to the plates. However, increasing the resistance of the layers typically results in reduced transparency which can obscure visibility of the display through the layers.

Another way to compensate for the effects of noise is to bias the touch-screen with a relatively large DC bias voltage. However, this results in increased power consumption. For example, when a touch-screen having a typical impedance of between 100Ω and 1 kΩ is biased with 2V, the power consumption will be between 40 mW and 4 mW.

Another way to address the issue of noise is to add capacitors, for example starting from 0.01 μF, from the touch-screen inputs to ground. The capacitors act as low-pass filters and improve the performance of the touch screen. However, this leads to increased cost. In addition, the capacitors can increase the settling time of the touch-screen when the drivers are turned on resulting in slower operation and increased latency.

Yet a further way to reduce the effects of noise is to take multiple co-ordinate measurements for a single touch event and to average these to produce a final measurement. However, this technique significantly increases the latency of the system, particularly since there is a relatively weak dependency on sensor sensitivity to the number of samples taken.

In embodiments of the invention, the choice of the pilot signals helps the controller to distinguish the signal from noise more clearly, allowing the power of the input signals to be significantly further reduced without loss of resolution. The power consumption of touch-screen devices is typically dominated by the sensor. For example, the power consumption of a typical sensor is around 20 mW while the power consumption of a typical controller is around 1 mW, making a total power consumption of around 21 mW. Using the invention, the power of the input signals can be 20-26 dB below that of existing systems while maintaining an equal resolution. In this case, the power consumption of the sensor can be reduced from 20 mW to 1-2 mW. This means that overall power consumption can be reduced from 21 mW to 2-3 mW, representing a decrease of 85-90%.

The frequencies of the pilot signals may be selected as appropriate, for example to achieve better attenuation of noise. In some cases, the selection of certain combinations of frequencies can be advantageous. For example, one common source of tonal noise arises from mobile telephones which often produce noise having a frequency around 214 Hz. It is preferable that an integer number of wavelengths of the noise signal occur during a sample time. It is also preferable that an integer number of wavelengths of one or both of the pilot signals occur during a sample time. In other words, the sample time is preferably an integer factor bigger than the reciprocal of the wavelength of the noise signal and/or one or both of the pilot signals. By setting one or more of the pilot signal frequencies, sample time and number of samples taken per co-ordinate measurement to achieve one or more of these conditions, better attenuation of noise can be achieved.

In the examples described above, the pilot signals were in the form of two cosinusoidal signals having different frequencies. However, alternative forms of input signals may also be used. For example, sinusoidal signals could be used for one or both of the pilot signals. Furthermore, one or both of the pilot signals may be in the form of a sum of two or more sinusoids and/or cosinusoids in order to increase the immunity to tonal noise. When one of the pilot signals is a sinusoid and the other pilot signal is a cosinusoid, it is not necessary for the two pilot signals to have different frequencies when they are applied simultaneously due to the orthogonality of sinusoidal and cosinusoidal functions. In yet a further example, the two input signals comprise spread-spectrum-coded sequences. In this example, the pilot signals may each comprise a sequence of values which are each either +1 or −1. The sum of two pilot signals of this form will comprise a sequence of values which are each either 0, +2 or −2.

In general, the applied signals are non-constant or time-varying signals having at least one characteristic feature (other than amplitude) that is known. For example, in the case of sinusoidal or cosinusoidal pilot signals, the characteristic feature is the frequency of the signal, whereas in the case of spread-spectrum-coded sequences, the feature is the known code. In this way, the signals are more easily distinguished from noise than constant signals. Furthermore, when the pilot signals are combined in the output signal, the individual components in the output signal can be distinguished from each other, allowing the pilot signals to be applied simultaneously.

When two pilot signals of sinusoidal or cosinusoidal form are applied simultaneously, it is preferable that the frequencies of the pilot signals are in a ratio of the form a/b where a and b are integers of relatively small size. For example, the frequency of the pilot signals may be in the ratio 3/2 or 2/1. In this case, the pilot signals are orthogonal functions allowing the attenuation factors associated with the two pilot signals to be found by applying Fourier analysis to the output signal. For example, If the output signal (formed from a sum of attenuated pilot signals) is multiplied by one of the input pilot signals ($P_1$ for example) and then integrated, the contribution in the output signal arising from the other pilot signal ($P_2$ in this case) drops out due to the orthogonality of the pilot signals. This leaves only the contribution from the other pilot signal ($P_1$) in the output signal, thus making it easier to determine the attenuation of this component.

The values of some or all of the parameters mentioned above may be dynamically variable, selected in advance from any suitable set of values, or may be fixed in the system, depending on the specific application.

By applying the pilot signals simultaneously, simultaneous measurement of the X and Y co-ordinates is made possible. The maximum operation frequency may be doubled and the operation latency may be halved. Furthermore, since it is not necessary to alternately switch individual input signals on and off as in conventional designs, problems due to switching transients are avoided. Power consumption is also reduced since fast charging effects are avoided.

Embodiments of the invention may have a good immunity to noise, meaning that position measurement errors are reduced. There is a high level of immunity to tonal noise, but some immunity to white noise is also achieved. The reduction of positional errors allows the resolution of the device to be maintained, even when power consumption is decreased. Furthermore, due to the reduced effects of noise, the resistive layers may be of a lower resistance, thereby allowing the transparency of the layers to be increased.

Embodiments of the invention are applicable to a wide range of touch-sensing apparatus, including the examples given previously. The techniques described above in relation to touch-screen apparatus may be applied equally to touch-sensing apparatus in which a display is not an integral part of the sensor. Embodiments of the present invention are also applicable to a wide range of resistive touch-screen designs, including, but not limited to, 4-wire and 5-wire varieties.

Embodiments of the invention may provide a touch-sensing apparatus in which latency and power consumption may be minimised whilst maintaining sensor accuracy and resolution. Furthermore, no modification of existing touch-sensor designs may be required to implement embodiments of the invention. Only relatively minor modification of the controller is needed.

Various modifications to the embodiments described above will readily occur to the skilled person. The invention is not limited to these specific examples.

The invention claimed is:

1. A controller for a touch-screen sensor having a resistive layer and a measuring electrode, the controller comprising:
   a voltage generator operative to generate a first time-varying voltage signal having at least one known characteristic, and a second time-varying voltage signal having at least one known characteristic different than the characteristic of the first signal, the first and second voltage signals both referenced to a common lower voltage;
   at least one output operative to output the common lower voltage such that the common lower voltage is applied to a first electrode positioned at a corner of the resistive layer of the sensor;
   at least one output operative to output the first time-varying voltage signal such that the first time-varying voltage signal is applied to a second electrode positioned at a next corner of the resistive layer of the sensor in a clockwise direction around the resistive layer starting at the first electrode;
   at least one output operative to output the second time-varying voltage signal such that the second time-varying voltage signal is applied to a third electrode positioned at a next corner of the resistive layer of the sensor in an anti-clockwise direction around the resistive layer starting at the first electrode;

an input operative to receive a measurement voltage signal representing the voltage on the resistive layer measured at a touch position by a measuring electrode of the sensor when the sensor is touched; and a processor operative to determine the co-ordinate of the touch position using the measurement voltage signal the co-ordinate being determined by determining the attenuation of the first and second voltage signals in the measurement voltage signal.

2. The controller of claim 1 wherein the first and second voltage signals both comprise one of a sinusoidal and a cosinusoidal voltage signal.

3. The controller of claim 2 wherein the first and second voltage signals have different frequencies.

4. The controller of claim 3 wherein the frequencies of the first and second voltage signals are in the ratio a/b where a and b are integers.

5. The controller of claim 1 wherein the first and second voltage signals each comprise a spread-spectrum-coded sequence.

6. The controller of claim 5 wherein the first and second voltage signals are different spread-spectrum-coded sequences.

7. The controller of claim 1 wherein the first and second voltage signals are applied across the resistive layer simultaneously.

8. The controller of claim 1 wherein the processor is further operative to determine the attenuation of the first and second voltage signal by selecting values for attenuation factors such that the first and second voltage signals most closely match an expected signal, the expected signal being based on an expected signal model including the attenuation factors and the applied voltage signals.

9. The controller of claim 8 wherein the expected signal model includes a phase factor representing the phase difference between an applied signal and the received signal.

10. The controller of claim 8 wherein the expected signal model includes a constant representing a DC component.

11. The controller of claim 1 wherein the duration of receiving the measuring voltage signal is equal to an integer multiple of the reciprocal of the wavelength of one or more of the first and second voltage signals.

12. The controller of claim 1 wherein the duration of receiving the measuring voltage signal is equal to an integer multiple of the reciprocal of the wavelength of a tonal noise signal.

13. The controller of claim 1 wherein the sensor comprises a 5-wire sensor.

14. A method of controlling a touch-screen sensor having a resistive layer and a measuring electrode, the method comprising the steps of:

generating a first time-varying voltage signal having at least one known characteristic, and a second time-varying voltage signal having at least one known characteristic different than the characteristic of the first signal, the first and second voltage signals both referenced to a common lower voltage;

outputting the common lower voltage such that the common lower voltage is applied to a first electrode positioned at a corner of the resistive layer of the sensor;

outputting the first time-varying voltage signal such that the first time-varying voltage is applied to a second electrode positioned at a next corner of the resistive layer of the sensor in a clockwise direction around the resistive layer starting at the first electrode;

outputting the second time-varying voltage signal such that the second time-varying voltage is applied to a third electrode positioned at a next corner of the resistive layer of the sensor in an anti-clockwise direction around the resistive layer starting at the first electrode;

outputting the first voltage signal such that the first voltage is applied across a resistive layer of the sensor in a first direction;

receiving a measurement voltage signal representing the voltage on the resistive layer measured at a touch position by a measuring electrode of the sensor when the sensor is touched; and determining the co-ordinate of the touch position using the measurement voltage signal, the co-ordinate being determined by determining the attenuation of the first and second voltage signals in the measurement voltage signal.

15. The controller of claim 1 wherein the common lower voltage is ground.

* * * * *